United States Patent
Huang

(10) Patent No.: US 9,250,635 B2
(45) Date of Patent: Feb. 2, 2016

(54) FAN CONTROL SYSTEM AND FAN CONTROL METHOD

(71) Applicant: HON HAI PRECISION INDUSTRY CO., LTD., New Taipei (TW)

(72) Inventor: Chang-Chih Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 451 days.

(21) Appl. No.: 13/873,253

(22) Filed: Apr. 30, 2013

(65) Prior Publication Data

US 2014/0148954 A1    May 29, 2014

(30) Foreign Application Priority Data

Nov. 28, 2012  (TW) .................................. 101144396

(51) Int. Cl.
  *G05D 23/00*    (2006.01)
  *G05D 23/19*    (2006.01)
  *G06F 1/20*     (2006.01)

(52) U.S. Cl.
  CPC ............ *G05D 23/1919* (2013.01); *G06F 1/206* (2013.01)

(58) Field of Classification Search
  CPC .... G05D 23/19; G05D 23/1928; G06F 1/206; Y02B 60/1275
  USPC ............................................. 700/28, 276.299
  See application file for complete search history.

(56) References Cited

U.S. PATENT DOCUMENTS

2012/0218707 A1*  8/2012  Chan ........................ 361/679.48
2014/0117906 A1*  5/2014  Busch et al. .................. 318/471

FOREIGN PATENT DOCUMENTS

| CN | 101303021 | 11/2008 |
| CN | 101832287 | 9/2010 |
| JP | 2009-069459 | * 2/2009 |

OTHER PUBLICATIONS

Translation of Japan Patent No. 2009-069459. Dated Feb. 4, 2009.*

* cited by examiner

*Primary Examiner* — Carlos Ortiz Rodriguez
*Assistant Examiner* — Chad Rapp
(74) *Attorney, Agent, or Firm* — Novak Druce Connolly Bove + Quigg LLP

(57) ABSTRACT

In a fan control method, consecutive temperature values are acquired at a time interval. Whether a current temperature value is higher than a threshold is determined. A difference between the current temperature value and a previous temperature value is calculated when the current temperature value is higher than the threshold. A fan is speeded up and the time interval is greatly shortened when the temperature difference is higher than a first trigger value. Only the time interval is slightly shorten when the temperature difference falls between the first trigger value and a second trigger value less than the first trigger value. Nothing to do when the temperature difference falls between the second trigger value and a third trigger value less than the third trigger value. The fan is slowed down and the time interval is extended when the temperature difference is lower than the third trigger value.

15 Claims, 2 Drawing Sheets

FAN CONTROL SYSTEM AND FAN CONTROL METHOD

BACKGROUND

1. Technical Field

The present disclosure relates to fan control systems and methods, and particularly to a fan control system and a method for automatically controlling fans.

2. Description of Related Art

Fan control is employed to control a speed of a fan depending on system temperature. For example, if the system temperature is higher than a threshold, the fan control speeds up the fan. In contrast, if the system temperature is lower than the threshold, the fan control slows down the fan. However, by speeding up the fan, the system temperature may fall below the threshold immediately and thus the fan control needs to slow down the fan accordingly. Similarly, by slowing down the fan, the system temperature may climb up the threshold immediately, and thus the fan control needs to speed up the fan. That is, the fan control becomes unstable when the system temperature various around the threshold.

Therefore, it is desirable to provide a fan control system and a method for controlling fans using the fan control system, which can overcome the above-mentioned problem.

DETAILED DESCRIPTION

Embodiments of the disclosure will be described with reference to the accompanying drawings.

Figure 1:
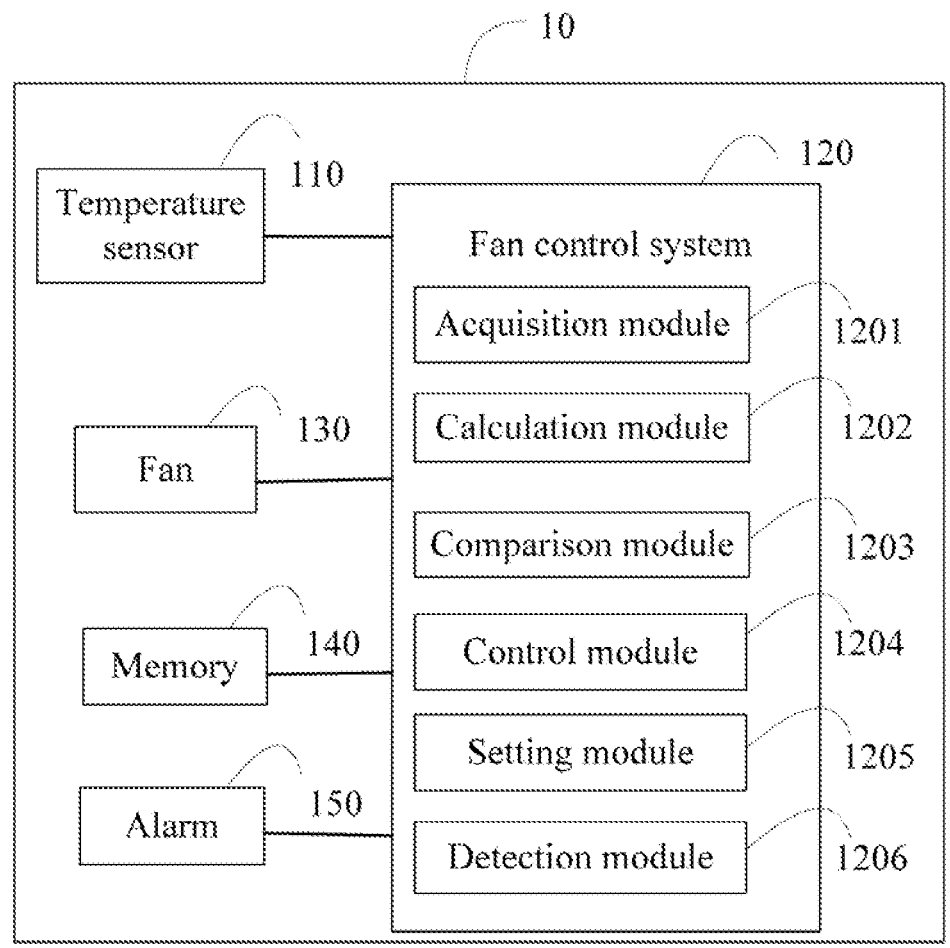
FIG. 1 is a functional block diagram of a fan control system, according to a first embodiment.

FIG. 1 is a fan control system 120 according to an embodiment. The fan control system 120 is installed in an electronic device 10, such as a high-end network switch, a server system, or a personal computer. The electronic device 10 includes, in addition to the fan control system 120, a temperature sensor 110, a fan 130, a memory 140, and an alarm 150.

The temperature sensor 110 is configured to keep sensing a system temperature of the electronic device 10 at a time interval. The time interval has an initial interval such as 5 minutes.

The fan control system 120 is configured to drive and control the fan 130 which is for dissipating heat from the electronic device.

The memory 140 stores a number of preset values including the initial time interval.

The alarm 150 is configured to make warnings such as a buzzing sound or flashing light.

The fan control system 120 includes an acquisition module 1201, a calculation module 1202, a comparison module 1203, a control module 1204, a setting module 1205, and a detection module 1206.

Figure 2:
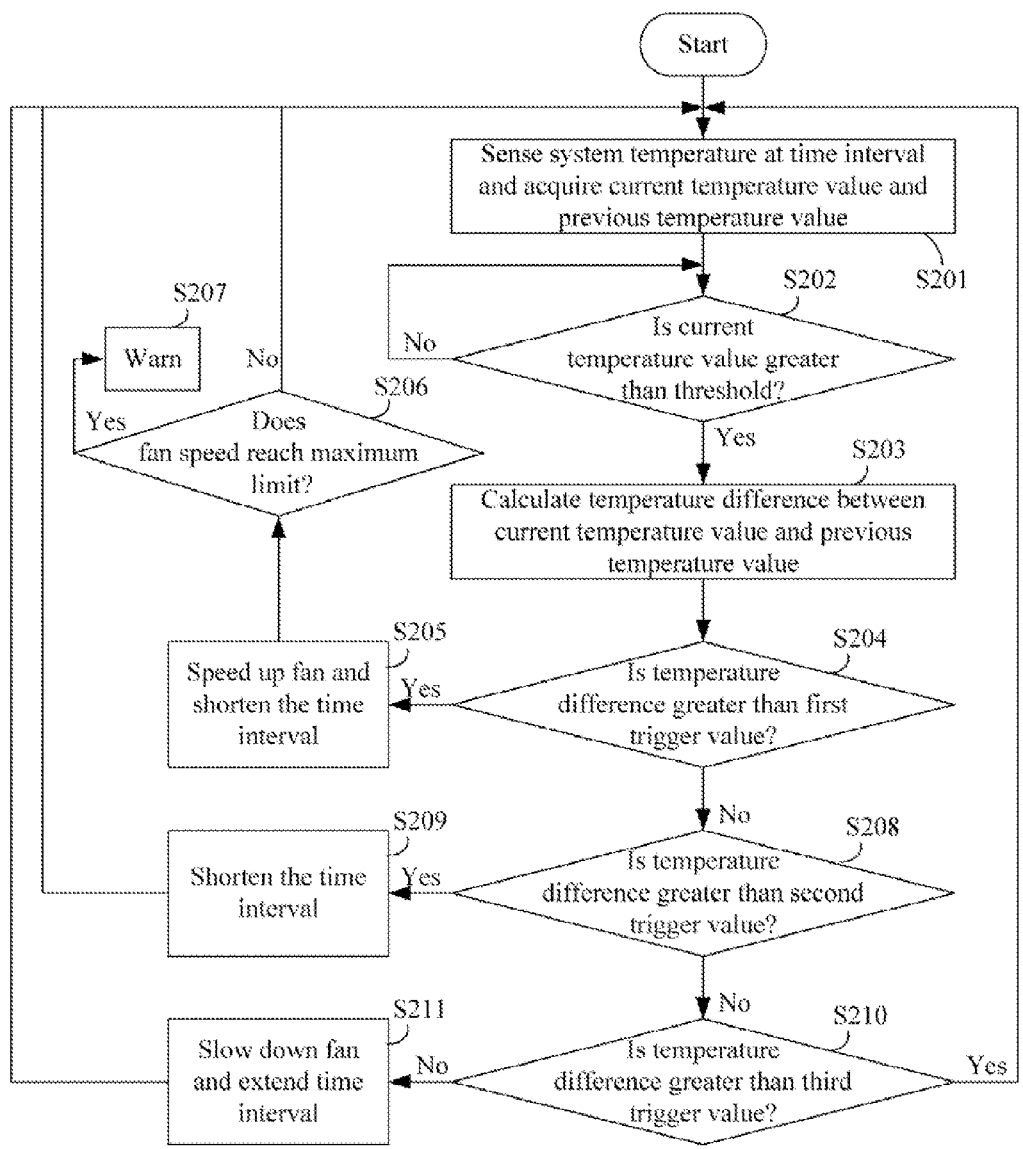
FIG. 2 is a flowchart showing a method for controlling a fan using the fan control system of FIG. 1.

FIG. 2 shows a method for controlling the fan 130 can be implemented by following steps S201-S212.

In the step S201, the temperature sensor 110 senses the system temperature at the initial interval, and the acquisition module 1201 thus continuously acquires a number of consecutive temperature values of the system temperature.

In the step S202, the comparison module 1203 determines whether a current temperature value is higher than a threshold. If yes, the step S203 is carried out, if no, the step S202 is repeated. The threshold such as 90 degrees Celsius is stored in the memory 140 as one of the preset values. When the system temperature exceeds the threshold, it indicates that the electronic device 20 is overheated.

In the step S203, the calculation module 1202 calculates a temperature difference between the current temperature value and a previous temperature value.

In the step S204, the comparison module 1203 determines whether the temperature difference is higher than a first trigger value. If yes, the step S205 is carried out otherwise, if no, the step S208 is carried out instead. The first trigger value such as 3 degrees Celsius can be stored in the memory 140 as one of the preset values. When the temperature difference exceeds the first trigger value, it indicates that the system temperature increases rapidly and the fan 130 can not efficiently cool down the electronic device 20.

In step S205, the control module 1204 speeds up the fan 130 by an increment to more efficiently cool down the electronic device 20 and the setting module 1205 shortens the time interval to a first interval to make the temperature sensor 110 sensing the system temperature at a higher frequency as the system temperature increases rapidly. The increment such as 2000 rpm and the first interval such as 1 minute are stored in the memory 140 as two of the preset values.

In step S206, the detection module 1206 detects whether a speed of the fan 130 reaches a maximum speed limit of the fan 130. If yes, the step S207 is carried out, if no, the step S201 is implemented using the first interval.

In step S207, the alarm 150 sends warnings to indicate that the fan 130 is unable to efficiently cool down the electronic device 10. The electronic device 10 may need to be shut down.

In step S208, the comparison module 1203 determines if the temperature difference is higher than a second trigger value which is lower than the first trigger value. If yes, the step S209 is carried out again, if no, the step S210 is carried out instead. The second trigger value such 1 degree Celsius can be stored in the memory 140 as one of the preset values. When the temperature difference is higher than the second trigger value but lower than the first trigger value, it indicates that increasing of the system temperature can not be neglected though the increasing of the system temperature is slow.

In step S209, the setting module 1205 shortens the time interval to a second interval, which is longer than the first interval, and then the step S201 is implemented using the second interval to monitor the system temperature at a higher frequency as the increasing of the system temperature can not be neglected. The second interval such as 1 minute is stored in the memory 140 as one of the preset values.

In the step S210, the comparison module 1203 determines if the temperature difference is higher than a third trigger value which is greater than the second trigger value. If yes, the step S201 is carried out again, but if no, the step S211 is carried out instead. The third trigger value such as −1 degree Celsius can be stored in the memory 140 as one of the preset values. When the temperature difference is greater than the third trigger value but lower than the second trigger value, it indicates that changing of the system temperature is small and can be neglected. In contrast, when the system temperature is lower than the third trigger value, it indicates that the system temperature become descending.

In the step S21, the control module 1204 slows down the fan 130 by a decrement which is less than the increment and the setting module 1205 extends the time interval to the initial interval as the system temperature is well controlled. The decrement such as 1000 rpm is stored in the memory 140 as one of the preset values.

In other embodiments, more than one temperature sensor 110 can be employed and the maximum of the temperature values sensed at the same time is taken as the temperature value at that moment.

Particular embodiments are shown here and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A fan control system installed in an electronic device, the fan control system comprising: a fan, a temperature sensor, and
    an acquisition module, to acquire a plurality of consecutive temperature values sensed and sent by the temperature sensor in the electronic device at a time interval, which comprise a current temperature value and a previous temperature value;
    a comparison module, to determine whether the current temperature value is higher than a threshold;
    a calculation module, to calculate a temperature difference between the current temperature value and the previous temperature value when the current temperature value of the current temperature value is higher than the threshold, the comparison module being configured to determine whether the temperature difference is higher than a first trigger value, a second trigger value less than the first trigger value, and a third trigger value less than the second trigger value;
    a control module, to speed up the fan by an increment when the temperature difference is higher than the first trigger value, or slow down the fan by a decrement when the temperature difference is lower than the third trigger value, or maintain a speed of the fan when the temperature difference falls between the first trigger value and the third trigger value; and
    a setting module, to shorten the time interval to a first interval when the temperature difference is higher than the first trigger value, shorten the time interval to a second interval which is longer than the first interval when the temperature difference is higher than the second trigger value, and maintain the time interval when the temperature difference falls between the second trigger value and the third trigger value, extend the time interval to an initial interval when the temperature difference is lower than the third trigger value.

2. The fan control system according to claim 1, wherein the detection module further detects whether the speed of the fan reaches a maximum speed limit of the fan, and the electronic device further comprises an alarm for warning when the speed of the fan reaches the maximum speed limit.

3. The fan control system according to claim 1, wherein the threshold, the first third trigger value, the second trigger value, the third trigger value, the initial interval, the first interval, and the second interval, the increment, and the decrement are stored in a memory in the electronic device.

4. The fan control system according to claim 1, wherein the increment is greater than the decrement.

5. The fan control system according to claim 1, wherein more than one temperature sensor are employed in the electronic device and the maximum of the temperature values sensed at the same time is taken as the temperature value of the system temperature at that moment.

6. A method for controlling a fan in an electronic device, the method comprising:
    acquiring a plurality of consecutive temperature values which are and sent by a temperature sensor in the electronic device at a time interval, which comprise a current temperature value and a previous temperature value;
    determining whether the current temperature value is higher than a threshold;
    calculating a temperature difference between the current temperature value and the previous temperature value of when the current temperature value is higher than the threshold;
    determining whether the temperature difference is higher than a first trigger value, a second trigger value less than the first trigger value, and a third trigger value less than the second trigger value;
    speeding up the fan by an increment when the temperature difference is higher than the first trigger value, maintaining a speed of the fan when the temperature difference falls between the first trigger value and the third trigger value, and slowing down the fan by a decrement when the temperature difference is lower than the third trigger value; and
    shortening the time interval to a first interval when the temperature difference is higher than the first trigger value or to a second interval, which is longer than the first interval, when the temperature difference falls between the first trigger value and the second trigger value, maintaining the time interval when the temperature difference falls between the second trigger value and the third trigger value, and extending the time interval to an initial value, which is longer than the second interval, when the temperature difference is lower than the third trigger value.

7. The method according to claim 6, further comprising:
    detecting whether a speed of the fan reaches a maximum speed limit of the fan; and
    warning by an alarm in the electronic device when the speed of the fan reaches the maximum speed limit.

8. The method according to claim 6, wherein the threshold, the first third trigger value, the second trigger value, the third trigger value, the initial interval, the first interval, the second interval, the increment, and the decrement are pre-stored in a memory in the electronic device.

9. The method according to claim 6, wherein the increment is greater than the decrement.

10. The method according to claim 6, wherein more than one temperature sensor are employed in the electronic device and the maximum of the temperature values sensed at the same time is taken as the temperature value of the system temperature at that moment.

11. A non-transitory computer readable medium comprising:
    an acquisition module, to acquire a plurality of consecutive temperature values sensed and sent by a temperature sensor in an electronic device at a time interval, which comprise a current temperature value and a previous temperature value;
    a comparison module, to determine whether the current temperature value is higher than a threshold;
    a calculation module, to calculate a temperature difference between the current temperature value and the previous temperature value when the current temperature value of the current temperature value is higher than the threshold, the comparison module being configured to determine whether the temperature difference is higher than a first trigger value, a second trigger value less than the first trigger value, and a third trigger value less than the second trigger value;

a control module, to speed up a fan by an increment when the temperature difference is higher than the first trigger value, or slow down the fan by a decrement when the temperature difference is lower than the third trigger value, or maintain a speed of the fan when the temperature difference falls between the first trigger value and the third trigger value; and a setting module, to shorten the time interval to a first interval when the temperature difference is higher than the first trigger value, or shorten the time interval to a second interval which is longer than the first interval when the temperature difference is higher than the second trigger value, or maintain the time interval when the temperature difference falls between the second trigger value and the third trigger value, extend the time interval to an initial interval when the temperature difference is lower than the third trigger value.

12. The storage medium according to claim 11, wherein the detection module further detects whether the speed of the fan reaches a maximum speed limit of the fan, and the electronic device further comprises an alarm for warning when the speed of the fan reaches the maximum speed limit.

13. The storage medium according to claim 11, wherein the threshold, the first third trigger value, the second trigger value, the third trigger value, the initial interval, the first interval, and the second interval, the increment, and the decrement are stored in a memory in the electronic device.

14. The storage medium according to claim 11, wherein the increment is greater than the decrement.

15. The storage medium according to claim 11, wherein more than one temperature sensor are employed in the electronic device and the maximum of the temperature values sensed at the same time is taken as the temperature value of the system temperature at that moment.

* * * * *